(12) United States Patent
Kim et al.

(10) Patent No.: US 11,843,711 B2
(45) Date of Patent: *Dec. 12, 2023

(54) DISPLAY APPARATUS

(71) Applicant: LG Display Co., Ltd., Seoul (KR)

(72) Inventors: Seon Man Kim, Paju-si (KR); MinHo Sohn, Paju-si (KR); JunSeok Oh, Paju-si (KR); Sung-Jin Kang, Paju-si (KR); Kyounghwan Kim, Paju-si (KR); Jeonggoo Kang, Paju-si (KR); JaiHyuk Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,337

(22) Filed: May 31, 2022

(65) Prior Publication Data

US 2022/0303374 A1 Sep. 22, 2022

Related U.S. Application Data

(63) Continuation of application No. 16/688,226, filed on Nov. 19, 2019, now Pat. No. 11,381,672.

(30) Foreign Application Priority Data

Dec. 4, 2018 (KR) .................. 10-2018-0154762

(51) Int. Cl.
*H04M 1/03* (2006.01)
*H04R 1/02* (2006.01)
(Continued)

(52) U.S. Cl.
CPC .............. *H04M 1/03* (2013.01); *H04R 1/023* (2013.01); *H04R 1/028* (2013.01); *H05K 5/0017* (2013.01); *H04N 5/642* (2013.01)

(58) Field of Classification Search
CPC ........ H04M 1/03; H04M 1/0266; H04M 9/06; H04R 1/023; H04R 1/028; H04R 7/045;
(Continued)

(56) References Cited

U.S. PATENT DOCUMENTS 8,811,017 B2 * 8/2014 Fujii ..................... G02F 1/1339
313/46
9,621,692 B2 4/2017 Lee
(Continued)

FOREIGN PATENT DOCUMENTS

CN 202887615 U 4/2013
CN 104143292 A 11/2014
(Continued)

OTHER PUBLICATIONS

Chinese Office Action dated Jul. 13, 2021 in CN 201911119089.2.
Office Action dated Aug. 2, 2023, issued in corresponding Korean Patent Application No. 10-2018-0154762.

*Primary Examiner* — Jacques M Saint Surin
(74) *Attorney, Agent, or Firm* — Morgan, Lewis & Bockius LLP

(57) ABSTRACT

A display apparatus includes a display module having a display panel configured to display an image; a sound generating device on a rear surface of the display panel and including a first side and a second side perpendicular to the first side and an adhesive member in a partial region of the sound generating device, the adhesive member having a size smaller than one of the first side and the second side of the sound generating device.

20 Claims, 11 Drawing Sheets

(51) Int. Cl.
*H05K 5/00* (2006.01)
*H04N 5/64* (2006.01)

(58) Field of Classification Search
CPC ............... H04R 1/025; H04R 2499/15; H04R
2499/11; H04R 17/005; H05K 5/0017;
H10K 59/10; G06F 1/1626; G06F 1/1643;
G06F 1/1656; G06F 1/1688; G09F 9/35;
H04N 5/642
USPC ........................................................ 73/625
See application file for complete search history.

(56) References Cited

U.S. PATENT DOCUMENTS

| | | | |
|---|---|---|---|
| 9,854,078 B2* | 12/2017 | Lee | ............... H04M 1/035 |
| 10,379,648 B2 | 8/2019 | Jiang et al. | |
| 10,469,928 B2 | 11/2019 | Kim et al. | |
| 10,582,282 B2 | 3/2020 | Kim | |
| 10,681,441 B2* | 6/2020 | Lee | ............... H04R 1/028 |
| 10,966,006 B2* | 3/2021 | Ozcan | ............... G06F 1/1688 |
| 10,972,819 B2 | 4/2021 | Kim et al. | |
| 11,064,277 B2 | 7/2021 | Lee et al. | |
| 11,381,672 B2* | 7/2022 | Kim | ............... H04R 1/028 |
| 2013/0272557 A1 | 10/2013 | Ozcan et al. | |
| 2014/0334078 A1 | 11/2014 | Lee et al. | |
| 2015/0078604 A1 | 3/2015 | Seo et al. | |
| 2015/0208172 A1 | 7/2015 | Kim et al. | |
| 2017/0289694 A1 | 10/2017 | Choi et al. | |
| 2018/0052567 A1 | 2/2018 | Miyamoto et al. | |
| 2018/0332376 A1 | 11/2018 | Lee | |
| 2019/0324596 A1 | 10/2019 | Lee et al. | |

FOREIGN PATENT DOCUMENTS

| | | |
|---|---|---|
| CN | 104461115 A | 3/2015 |
| CN | 104751743 A | 7/2015 |
| CN | 107533408 A | 1/2018 |
| CN | 108877597 A | 11/2018 |
| EP | 3 331 251 A1 | 6/2018 |
| JP | 2005-303937 A | 10/2005 |
| KR | 2009035881 A | 4/2009 |
| KR | 10-2015-0031641 A | 3/2015 |
| KR | 10-1817102 B1 | 1/2018 |

* cited by examiner

DISPLAY APPARATUS

CROSS-REFERENCE TO RELATED APPLICATIONS

This application is a Continuation of a co-pending U.S. patent application Ser. No. 16/688,226, filed on Nov. 19, 2019, which claims the benefit and priority to Korean Patent Application No. 10-2018-0154762, filed on Dec. 4, 2018. The entirety of each of the above prior U.S. and Korean patent applications is hereby incorporated by reference.

BACKGROUND

Technical Field

The present disclosure relates to a display apparatus.

Discussion of the Related Art

A display apparatus may be mounted in electronic products or home appliances such as a television, a monitor, a notebook computer, a smartphone, a tablet computer, an electronic pad, a wearable device, a watch phone, a portable information device, a navigation device, vehicle control display equipment, and the like and used as a screen displaying an image. The display apparatus may include a display panel displaying an image and a sound device outputting a sound related to an image.

Recently, demand for lighter, thinner display apparatuses has increased, while screens thereof tend to be enlarged. However, since the display apparatus must have sufficient space for installation of a sound device such as a speaker for outputting sound, it is difficult to reduce the weight and size of the display apparatuses. In addition, since sound generated by the sound device built in a display apparatus is output in directions toward a rear surface or a side surface of a main body of the display apparatus, rather than to a front surface of a display panel, sound does not travel toward a viewer or a user who views an image in front of the display panel, immersion of the viewer who watches the image may be disturbed.

SUMMARY

Therefore, the inventors of the present disclosure recognized the above-mentioned problems and conducted several experiments to check whether a traveling direction of sound can be a front surface of a display panel when an image is viewed from the front surface of the display panel and sound quality of sound can be enhanced. Through several experiments, the inventors invented a display apparatus having a novel structure capable of generating sound toward the front surface of the display panel and improving sound.

Accordingly, embodiments of the present disclosure are directed to a display apparatus that substantially obviates one or more problems due to limitations and disadvantages of the related art.

An aspect of the present disclosure is to provide a display apparatus capable of outputting sound toward the front of a display panel through vibration of the display panel and improving sound.

Additional features and aspects will be set forth in the description that follows, and in part will be apparent from description or may be learned by practice of inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a display apparatus comprises a display module having a display panel configured to display an image, a sound generating device on a rear surface of the display panel and including a first side and a second side perpendicular to the first side, and an adhesive member in a partial region of the sound generating device, the adhesive member having a size smaller than one of the first side and the second side of the sound generating device.

In another aspect, a display apparatus comprises a display module having a display panel configured to display an image, a sound generating device on a rear surface of the display panel and including a first side and a second side perpendicular to the first side, and an adhesive member between the display panel and the sound generating device, the adhesive member including a first side and a second side perpendicular to the first side, wherein a length of the first side of the adhesive member is smaller than or equal to a length of the first side of the sound generating device and a length of the second side of the adhesive member is smaller than or equal to a length of the second side of the sound generating device.

A display apparatus according to an embodiment of the present disclosure may include the sound generating device that generates sound by vibrating the display panel, whereby sound whose traveling direction in the display apparatus is a front side of the display panel may be generated. Therefore, an immersion feeling of a viewer who watches an image of the display apparatus may be enhanced.

A display apparatus according to an embodiment of the present disclosure may provide a sound generating device with an improved vibration characteristic by configuring an adhesive member in a partial region of the sound generating device.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and examples and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this application, illustrate embodiments of the disclosure and together with the description serve to explain the various principles of the disclosure.

Figure 1:
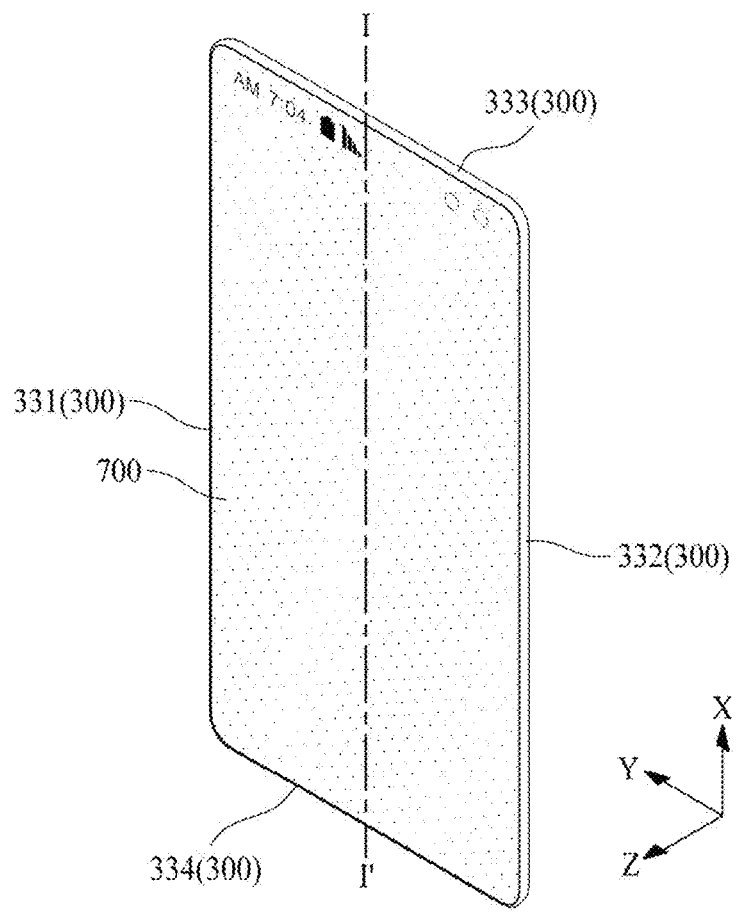
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to the embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. In the following description, when the detailed description of the relevant known function or configuration is determined to unnecessarily obscure the important point of the present disclosure, the detailed description of such known function or configuration may be omitted. When terms "comprise," "have," and "include" described in the present specification are used, another part may be added unless a more limiting term, such as "only," is used. The terms of a singular form may include plural forms unless referred to the contrary.

In construing an element, the element is construed as including an error tolerance range even where no explicit description of such an error or tolerance range.

In describing a position relationship, when a position relation between two parts is described as, for example, "on," "over," "under," and "next," one or more other parts may be disposed between the two parts unless a more limiting term, such as "just" or "direct(ly)" is used. In describing a time relationship, when the temporal order is described as, for example, "after," "subsequent," "next," or "before," a case that is not continuous may be included, unless a more limiting term, such as "just," "immediate(ly)," or "direct(ly)," is used.

In describing a time relationship, for example, when the temporal order is described as "after," "subsequent," "next," and "before," a case which is not continuous may be included, unless a more limiting term, such as unless "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as "first," "second," "A," "B," "(a)," "(b)," may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatuses for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic device which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set apparatus.

A display panel applied to an embodiment of the present disclosure may use any type of display panel, such as a liquid crystal display panel, an organic light emitting diode (OLED) display panel, and an electroluminescent display panel, but is not limited to a specific display panel which is vibrated by a sound generation device according to an embodiment of the present disclosure to output sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, embodiments are not limited to the metal plate, and the display panel may include another structure.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Hereinafter, embodiments of the present disclosure will be described with reference to the accompanying drawings. In the following description, when the detailed description of the relevant known function or configuration is determined to unnecessarily obscure the present disclosure, the detailed description may be omitted. Also, for convenience of description, a scale of each of elements illustrated in the accompanying drawings differs from a real scale, and thus, is not limited to a scale illustrated in the drawings.

Figure 2:
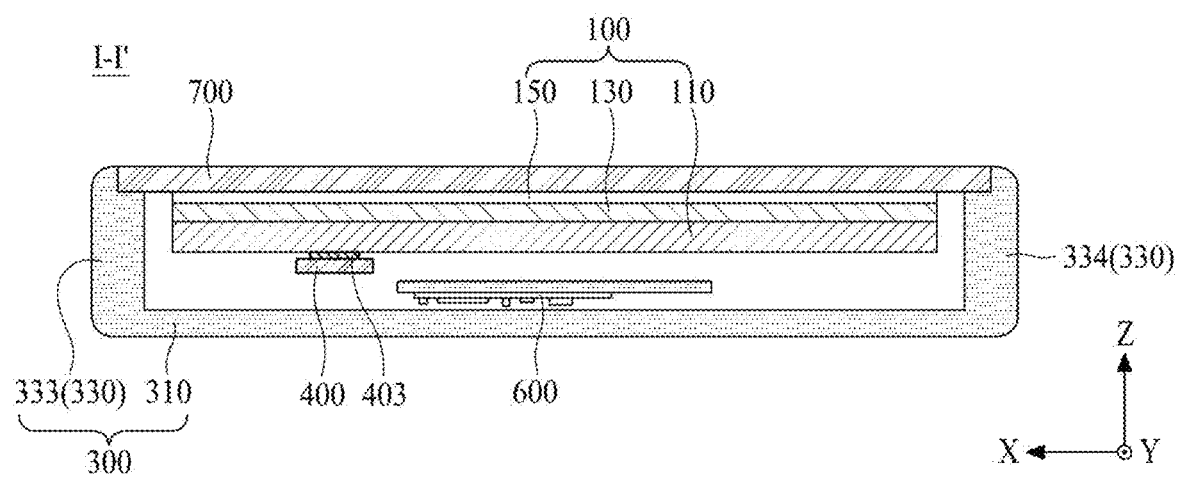
FIG. 2 is a cross-sectional view taken along line I-I' shown in FIG. 1.
Figure 3:
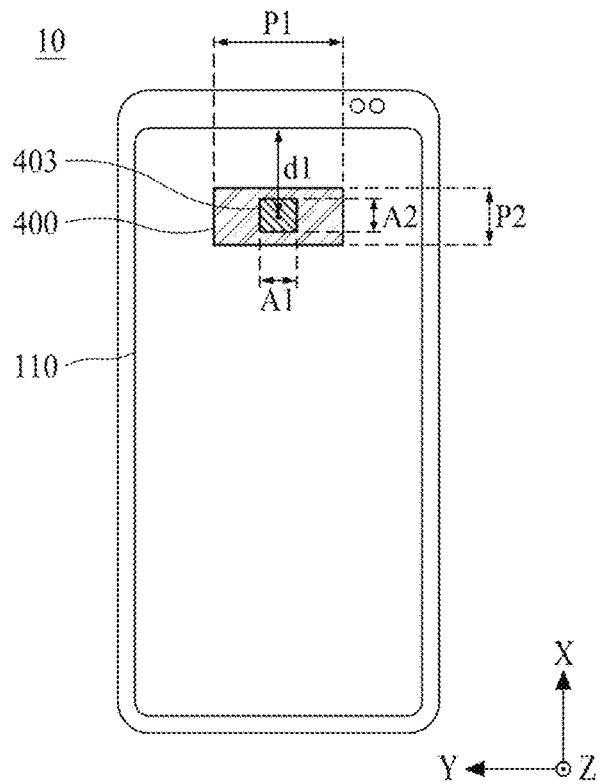
FIG. 3 is a rear view of a display panel shown in FIG. 1.

FIG. 1 illustrates a display apparatus according to an embodiment of the present disclosure. FIG. 2 is a cross-sectional view taken along line I-I' shown in FIG. 1. FIG. 3 is a rear view of a display panel illustrated in FIG. 1.

With reference to FIGS. 1 to 3, a display apparatus 10 according to an embodiment of the present disclosure may include a display module 100, a supporting member 300, and a sound generating device 400.

The display module 100 may include a display panel 110. The display panel 110, which displays an image, for example, an electronic image or a digital image, may be realized as any type of display panel such as a liquid crystal display panel, an organic light emitting diode (OLED) display panel, an electroluminescent display panel, and the like. The display panel 110 may vibrate according to vibration of the sound generating device 400 and output sound in a direction toward the front of the display panel 110. The sound generating device 400 may generate sound using the display panel 110 as a diaphragm. The sound generating device may be expressed as an actuator, an exciter, or a transducer and is not limited thereto. For example, the sound generating device 400 may be a sound device that outputs sound according to an electrical signal.

For example, the display panel 110 may be a light emitting display panel or a flexible light emitting display panel but is not limited thereto. The display panel 110 may include a pixel array substrate having a pixel array layer including a plurality of pixels, and an encapsulation layer for encapsulating the pixel array.

For example, depending on the structure of the pixel array layer including an anode electrode, a cathode electrode, and an organic compound layer, the display panel 110 may display an image according to a top emission type, a bottom emission type, or a dual emission type. The top emission type may display an image by emitting visible light generated in the pixel array layer to the front side of the base substrate, and the bottom emission type may display an image by emitting visible light generated in the pixel array layer to the rear side of the base substrate. The dual emission type may display an image by emitting visible light generated in the pixel array layer to the front side and the rear side of the base substrate.

The plurality of pixels may be disposed in the pixel areas provided by the pixel driving lines, respectively. Each of the plurality of pixels may include a pixel circuit having at least two thin film transistors (TFTs) and at least one capacitor and a light emitting device emitting light by a current supplied from the pixel circuit. For example, the light emitting device may include an organic light emitting layer or a quantum dot light emitting layer, but is not limited thereto. As another example, the light emitting device may include a micro light emitting diode (LED) but is not limited thereto.

The encapsulation layer may protect the TFT, the light emitting device, and the like from external impact and prevent moisture from penetrating into the light emitting device. The encapsulation layer may be replaced by an encapsulation substrate attached to the pixel array substrate via a filler surrounding the pixel array. When the filler is formed as a transparent filler, the encapsulation substrate may be a transparent encapsulation substrate.

The display module 100 according to an embodiment of the present disclosure may further include a touch panel 130. The touch panel 130 may include a touch electrode layer on the display panel 110 and having a touch electrode for sensing a user's touch to the display module 100. The touch electrode layer may sense a change in capacitance of the touch electrode according to the user's touch. For example, a mutual-capacitance type in which a plurality of touch driving electrodes and a plurality of touch sensing electrodes intersect each other or a self-capacitance type in which only a plurality of touch sensing electrodes are arranged may be applied, and an adhesive layer may be disposed on an upper surface or a lower surface of the touch electrode layer to adhere and fix the touch electrode layer to an upper or lower component.

The display module 100 according to an embodiment of the present disclosure may further include a polarizing film 150 on the touch panel 130. The polarizing film 150 may be attached to the upper surface of the touch panel 130 via a film attaching member. The polarizing film may change external light reflected by the TFT and/or pixel driving lines provided on the pixel array substrate into the circularly polarized state, thereby improving visibility and a contrast ratio of the display panel 110. The polarizing film 150 may be between the encapsulation layer of the display panel 110 and the touch panel 130.

The display module 100 may further include a barrier layer interposed between the encapsulation layer of the display panel 110 and the touch panel 130. The barrier layer may prevent moisture or the like from penetrating toward the pixel array.

The display module 100 may further include a color filter layer on an upper surface of the encapsulation layer of the display panel 110. The color filter layer may overlap each of the plurality of pixels and include a color filter allowing only a wavelength of a color set in each of the plurality of pixels to be transmitted therethrough.

The supporting member 300 may receive the display module 100. Here, in this disclosure, the supporting member 300 may be expressed as a "cover bottom," a "plate bottom," a "back cover," a "base frame," a "metal frame," a "midframe," a "metal chassis," a "chassis base," an "m-chassis," a "housing," and the like. Therefore, the supporting member 300 may include any type of frame or plate-like structure on a rear surface of the display apparatus, as a support structure for supporting the display panel 110.

For example, the supporting member 300 may include a supporting member rear surface portion 310 and a supporting member side surface portion 330. The supporting member rear surface portion 310 may be on the rear surface of the display module 100 to cover the rear surface of the display module 100. For example, the supporting member rear surface portion 310 may cover a circuit receiving space in the rear surface of the display module 100. For example, the supporting member rear portion 310 of the supporting member may be formed of the same material as the cover window 700 or may be formed of a glass material different from the cover window 700. For example, the supporting member rear surface portion 310 may be a rear surface cover, but is not limited thereto. For example, the supporting member rear surface portion 310 may be configured separately from the supporting member side surface portion 330.

The supporting member side surface portion 330 may surround each side surface of the display module 100 to have a display receiving space in which the display module 100 is received. The supporting member side surface portion 330 may be formed in a frame shape or a rounded shape, but is not limited thereto. For example, each side surface of the supporting member may be rounded to have a constant radius of curvature to improve an aesthetic sense of the display apparatus.

The supporting member side surface portion 330 may include first to fourth side surfaces 331, 332, 333, and 334 of the supporting member 300. The first to fourth side surfaces 331, 332, 333, and 334 of the supporting member 300 may provide a receiving space for receiving the display module 100. For example, the first to fourth side surfaces 331, 332, 333, and 334 of the supporting member 300 may provide a circuit receiving space for receiving peripheral circuits of an electronic device including a circuit component of a driving circuit unit, a battery, and the like.

The first side surface 331 of the supporting member may be parallel to a first lengthwise direction X of the display apparatus. For example, the first side surface 331 of the supporting member may be disposed perpendicular to a first side surface or a first long side of the supporting member rear surface portion 310. The first side surface 331 of the supporting member may wrap or surround a first side surface or one horizontal side of the display module 100.

The second side surface 332 of the supporting member may be parallel to the first side surface 331 of the supporting member. For example, the second side surface 332 of the supporting member may be disposed perpendicular to a second side surface or a second long side of the supporting member rear surface portion 310. The second side surface 332 of the supporting member may wrap or surround a second side surface or the other horizontal side of the display module 100.

The third side surface 333 of the supporting member may be parallel to a second lengthwise direction Y intersecting the first lengthwise direction X of the display apparatus. For example, the third side surface 333 of the supporting member may be disposed perpendicular to the third side surface or the first short side of the supporting member rear surface portion 310. The third side surface 333 of the supporting member may wrap or surround a third side surface or one vertical side of the display module 100.

The fourth side surface 334 of the supporting member may be parallel to the third side surface 333 of the supporting member. For example, the fourth side surface 334 of the supporting member may be disposed perpendicular to the fourth side surface or the second short side of the supporting member rear surface portion 310 of the supporting member. The fourth side surface 334 of the supporting member may wrap or surround the fourth side surface or the other vertical side of the display module 100.

The sound generating device 400 may be on the rear surface of the display module 100, for example, on the rear surface of the display panel 110 and may vibrate the display module 100 according to a vibration driving signal. Accordingly, the sound generating device 400 may output sound in a forward direction Z of the display panel 110 according to the vibration of the display panel 110.

The supporting member 300 according to an embodiment of the present disclosure may further include a vibration element exposing part on the supporting member side surface portion 330 (e.g., the third side surface 333) of the supporting member. For example, the vibration element exposing part may protrude from the supporting member side surface portion 330 of the supporting member and be the periphery of the sound generating device 400. Accordingly, the sound generating device 400 attached to the rear surface of the display module 100 may be exposed to the outside through the vibration element exposing part. A portion of a lower portion of the sound generating device 400 may be inserted or accommodated into the vibration element exposing part. The vibration element exposing part may secure a vibration space for vibration of the sound generating device 400 on the display module 100 to make the display apparatus slimmer and facilitate arrangement of the sound generating device 400. If a distance between the supporting member rear surface portion 310 and the rear surface of the display module 100 is larger than the vibration space, the vibration element exposing part may be omitted.

A vibration generating element of the sound generating device 400 may include a piezoelectric material layer having a piezoelectric effect and an electrode in an edge or periphery of the piezoelectric material layer. In another example, the electrode may be on an upper surface and/or a lower surface of the piezoelectric material layer. The electrode may be formed of an opaque metal material having relatively low resistance and excellent heat dissipation characteristic. However, the present disclosure is not limited thereto, and the electrode may be formed of a transparent conductive material or a conductive polymer material according to circumstances. Since the vibration generating element includes the piezoelectric material layer, it may be expressed as a "piezoelectric element."

The piezoelectric material layer may include a piezoelectric material that generates vibration by an electric field. The piezoelectric material has such a characteristic that a potential difference is made due to dielectric polarization based on a change in relative position of positive (+) and negative (−) ions as a pressure or distortion phenomenon acts on a crystal structure due to an external force and vibration is generated by a field in accordance with a reversely applied voltage.

The vibration generating element of the sound generating device 400 may include a piezoelectric material of a polymer material, a piezoelectric material of a thin film material, a piezoelectric material of a composite material, or a piezoelectric material of a single crystal ceramic or polycrystalline ceramic. The piezoelectric material of the polymer material may include polyvinylidene difluoride (PVDF), P(VDF-TrFe), or P (VDFTeFE). The piezoelectric material of the thin film material may include zinc oxide (ZnO), cadmium sulfide (CdS), or aluminum nitride (AlN). The piezoelectric material of the composite material may include lead zirconate titanate (PZT)-PVDF, PZT-silicon rubber, PZT-epoxy, PZT-foamed polymer, or PZT-foamed urethane. The piezoelectric material of the single crystal ceramic may include alpha-aluminum phosphate ($\alpha$-AlPO$_4$), alpha-silicon dioxide ($\alpha$-SiO$_2$), lithium niobate (LiNbO$_3$), terbium molydbate (Tb$_2$(MoO$_4$)$_3$), lithium borate (or lithium tetraborate) (Li$_2$B$_4$O$_7$), or zinc oxide (ZnO). The piezoelectric material of the polycrystalline ceramic may include PZT, PT, PZT-complex perovskite, or barium titanate oxide (BaTiO$_3$). Embodiments of the present disclosure are not limited to these materials.

The vibration generating element of the sound generating device 400 may have a shape such as a rectangle, a square, a rhombus, and a parallelogram, but is not limited thereto. For example, the vibration generating element may be formed of a circular shape, an oval shape, and any other shape. The oval shape may include an elliptical shape, a rectangular shape with rounded corners, or non-circular curved shape having a width different from its height, but is not limited thereto.

To protect the vibration generating element of the sound generating device 400, a protective member may be further disposed. The protective member may be formed to have a larger size than or the same size as that of the sound generating device which is the vibration generating element, and may be attached to the rear surface of the sound generating device which is the vibration generating element. The protective member may prevent damage to the sound generating device due to an electrical shock such as static electricity and/or physical shock. For example, the sound generating device 400 may be damaged by static electricity generated in the display module 100, such as a panel driving circuit or introduced from the outside and may be damaged by physical contact with the display module 100 due to pressing of the display module 100. Thus, the protective member may be on the rear surface of the sound generating device 400, thereby protecting the sound generating device 400 from static electricity by blocking the static electricity transmitted to the sound generating device 400 through the display module 100 and protecting the sound generating device 400 from physical shock applied to the sound generating device 400 from the display module 100. The protective member may include, but is not limited to, a single-sided insulation tape or an insulating single-sided foam tape having an adhesive layer attached to the rear surface of the sound generating device 400. For example, the protective member may be a polyethylene terephthalate (PET) insulating tape or a polyvinyl chloride (PVC) insulating tape, but is not limited thereto.

The display apparatus according to an embodiment of the present disclosure may further include a driving circuit unit 600 and a cover window 700.

The driving circuit unit 600 may be in a circuit receiving space in the supporting member 300 and may be connected to the display panel 110 and the sound generating device 400. The driving circuit unit 600 may include a panel driving circuit and a sound processing circuit.

The panel driving circuit may be mounted on the display panel 110 or the circuit board to display an image on the display panel 110. The panel driving circuit may be connected to a pad part on the pixel array substrate of the display panel 110 and supply a driving signal and a data signal to the pixel driving lines, thereby displaying an image on each pixel.

The sound processing circuit may generate an audio signal based on an audio source and amplify the audio signal to generate a vibration driving signal. The sound generating device 400 may be vibrated according to the generated vibration driving signal.

The cover window 700 may be coupled or connected to the supporting member 300 to support the display module 100. The cover window 700 may be formed of glass or a reinforced glass material. For example, the cover window 700 may have either a sapphire glass or a Gorilla glass or a bonding structure thereof. The cover window 700 may be attached to the front surface of the display module 100 via an adhesive member. The adhesive member may be, but is not limited to, an optically clear adhesive (OCA), an optically clear resin (OCR), or a pressure sensitive adhesive (PSA).

The cover window 700 may cover the non-display area except the display area of the display module 100. For example, the cover window 700 may include a transparent area overlapping the display area of the display module 100, a light blocking area overlapping the non-display area of the display module 100, and a design layer provided in the light blocking area to cover the non-display area of the display module 100. The cover window 700 may be a supporting member, a window cover, or the like, and is not limited thereto.

The sound generating device 400 may be attached or coupled to the rear surface of the display panel 110 via the adhesive member 403. If the adhesive member 403 is on the entire surface of the sound generating device 400, a compressive tensile force at a central portion and a compressive tensile force at an edge portion of the vibration generating element configuring the sound generating device 400 are opposite to each other, making it difficult to implement a desired sound characteristic. This will be described with reference to FIGS. 4A and 4B.

Figure 4A:
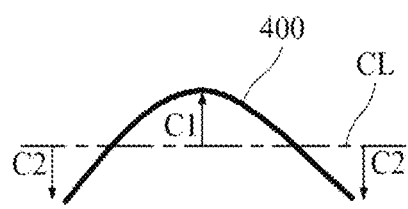
FIGS. 4A and 4B illustrate vibration of a sound generating device according to an embodiment of the present disclosure.
Figure 4B:
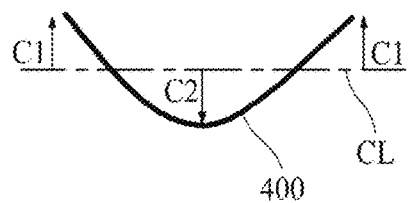

FIGS. 4A and 4B illustrate vibration of a sound generating device according to an embodiment of the present disclosure.

The sound generating device 400 may include a unimorph vibration generating element or a bimorph vibration generating element. The unimorph vibration generating element or the bimorph vibration generating element may include, for example, two, four, eight, or sixteen layers but is not limited thereto. With reference to FIGS. 4A and 4B, the sound generating device 400 is a bimorph vibration generating element including an upper layer and a lower layer, and a case where the sound generating device 400 is attached to the entire surface of the display panel by an adhesive member will be described as an example. FIG. 4A shows the upper layer and FIG. 4b shows the lower layer. With reference to FIGS. 4A and 4B, when the upper layer is tensioned (C1), the lower layer is compressed (C4), and conversely, when the upper layer is compressed (C2), the lower layer moves in a tension C3 direction. The sound generating device may be vibrated according to repetition of tension and compression. It can be seen that, when the upper layer is tensioned (C1) and the lower layer is compressed (C4) with respect to an initial position at which the vibration generating element of the sound generating device is not moved or vibrated, for example, with respect to a central line CL or a neutral plane, the central region of the vibration generating element rises in an upward direction and the edge region of the vibration generating element descends in a downward direction. Therefore, when the adhesive member is attached to the entire surface of the sound generating device, a vibration force pushing up the central region of the vibration generating element is opposite to a vibration force of the edge region of the vibration generating element, and thus, the pushing force of pushing the central region of the vibration generating element is disturbed by the vibration force of the edge region of the vibration generating element. As a result, it was recognized that the vibration transmission characteristic of the sound generating device was deteriorated because the central region of the vibration generating element in which vibration is significantly generated is affected by the vibration. Therefore, the inventors of the present disclosure conducted various experiments to realize a sound generating device in which the vibration characteristic is not deteriorated. The inventors of the present disclosure invented a sound generating device having a novel structure in which the vibration characteristic is not deteriorated through various experiments. This will be described with reference to FIGS. 1 to 3.

With reference to FIGS. 1 to 3, the sound generating device 400 may be attached to or coupled to the rear surface of the display panel 110 via an adhesive member 403. The adhesive member 403 may be in a region where the vibration of the sound generating device 400 significantly occurs. For example, the adhesive member 403 may be in a partial region of the sound generating device 400. For example, the adhesive member 403 may be in an area which vibrates in the same direction as the sound generating device 400 or in a central region of the sound generating device 400. Therefore, since the adhesive member 403 is in the partial region of the sound generating device 400, the vibration at the central region of the sound generating device 400 may be less affected by the vibration at the edge or periphery region of the sound generating device 400. For example, since the adhesive member is disposed at the central region of the sound generating device 400, the influence of the vibration due to the edge of the sound generating device may be reduced and the vibration at the central region of the sound generating device may be enhanced, whereby the vibration characteristic of the sound generating device may be improved. A height of the adhesive member 403 may be set not to be in contact with the display panel 110 when the sound generating device 400 vibrates.

The adhesive member 403 may include a double-sided tape, a double-sided foam tape, a thermosetting adhesive, a photo-curable adhesive, and a natural curable adhesive, but is not limited thereto. For example, the thermosetting adhesive may be an epoxy resin, but is not limited thereto. For example, the adhesive member 403 may be formed of polyurethane, polyolefin, and polyethylene, but is not limited thereto. The adhesive member 403 may be a sticking member or a sticking agent, but is not limited thereto.

Therefore, to improve the vibration characteristic of the sound generating device 400, the size of the adhesive member 403 may be smaller than the size of the sound generating device 400. The sound generating device 400 may have a first side and a second side perpendicular to the first side. The adhesive member 403 may have a first side and a second side perpendicular to the first side. The first side of the sound generating device may correspond to the first side of the adhesive member and the second side of the sound generating device may correspond to the second side of the adhesive member. For example, the first side of the sound generating device and the adhesive member may be in a widthwise direction, and the second side of the sound generating device and the adhesive member may be in a lengthwise direction. The widthwise direction and the lengthwise direction may be intermixed in any combination or interchangeable. As another example, the vibration generating element of the sound generating device 400 may have a shape such as a rectangle (e.g. quadrilateral), a square, a rhombus, and a parallelogram, and is not limited thereto. The adhesive member 403 may disposed corresponding to the shape of the sound generating device. For example, the sound generating device 400 may be rectangular (e.g. quadrilateral) and may include a first side and a second side disposed adjacent to the first side and bent at a 90 degree angle so as to be disposed. The angle of the second side does not limit the embodiment of the present disclosure. For example, the adhesive member 403 may be rectangular and may include a first side and a second side disposed adjacent to the first side and bent at a 90 degree angle so as to be disposed. The angle of the second side does not limit the embodiment of the present disclosure.

For example, a length A1 of the first side of the adhesive member 403 may be 0.2 times to 1 time a length P1 of the first side of the sound generating device 400. For example, a length A1 of the first side of the adhesive member 403 may be more than 0.2 times to 1 time a length P1 of the first side of the sound generating device 400. For example, a length A2 of the second side of the adhesive member 403 may be 0.2 times to 1 time a length P2 of the second side of the sound generating device 400. For example, a length A2 of the second side of the adhesive member 403 may be more than 0.2 times to 1 time a length P2 of the second side of the sound generating device 400.

For example, the size of the adhesive member 403 may be varied according to the length P1 of the first side and the length P2 of the second side of the sound generating device 400, but is not limited thereto. For example, when the length P1 of the first side of the sound generating device 400 is larger than the length P2 of the second side of the sound generating device 400, the length A1 of the first side of the adhesive member 403 may be more than 0.2 times to less than 0.5 times the length P1 of the first side of the sound generating device 400. For example, when the length P1 of the first side of the sound generating device 400 is larger than the length P2 of the second side of the sound generating device 400, the length A2 of the second side of the adhesive member 403 may be more than 0.5 times to 1 time the length P2 of the second side of the sound generating device 400. For example, when the length P1 of the first side of the sound generating device 400 is smaller than the length P2 of the second side of the sound generating device 400, the length A1 of the first side of the adhesive member 403 may be more than 0.5 times to 1 time the length P1 of the first side of the sound generating device 400. For example, when the length P1 of the first side of the sound generating device 400 is smaller than the length P2 of the second side of the sound generating device 400, the length A2 of the second side of the adhesive member 403 may be more than 0.2 times to less than 0.5 times the length P2 of the second side of the sound generating device 400. For example, when the length P1 of the first side of the sound generating device 400 is equal to the length P2 of the second side of the sound generating device 400, the length A1 of the first side of the adhesive member 403 may be more than 0.4 times to 1 time the length P1 of the first side of the sound generating device 400. For example, when the length P1 of the first side of the sound generating device 400 is equal to the length P2 of the second side of the sound generating device 400, the length A2 of the second side of the adhesive member 403 may be more than 0.4 times to 1 time the length P2 of the second side of the sound generating device 400.

The sound generating device 400 may be on an upper portion of the rear surface of the display panel 110. The display panel 110 may include a first short side, a second short side facing the first short side, and a long side perpendicular to the first short side or the second short side. For example, the first short side and the second short side may be in a widthwise direction of the display panel 110, and the long side may be in a lengthwise direction of the display panel 110. The widthwise direction and the lengthwise direction may be intermixed in any combination or interchangeable. For example, a distance d1 between the center of the sound generating device 400 and the end of the first short side of the display panel 110 may be ¼ to ⅓ of the long side of the display panel 110. When the sound generating device 400 is disposed on the upper side of the rear surface of the display panel 110, sound pressure may be further improved than when the sound generating device 400 is disposed at the center of the display panel 110.

Figure 5A:
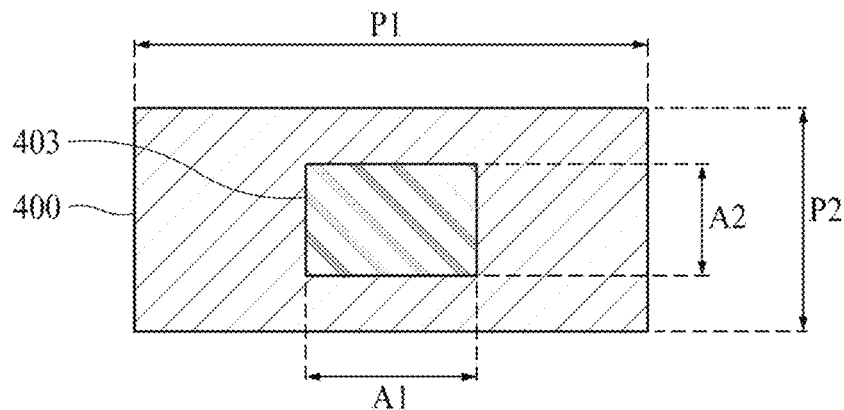
FIGS. 5A to 5C illustrate a sound generating device and an adhesive according to an embodiment of the present disclosure.
Figure 5B:
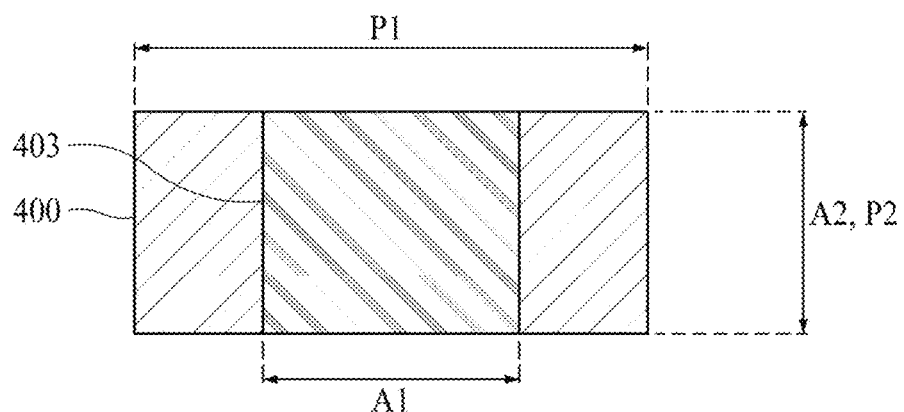
Figure 5C:
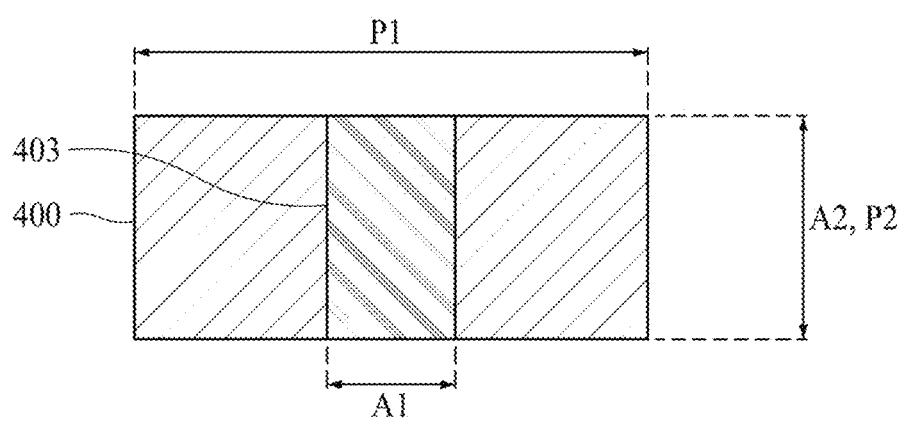

FIGS. 5A to 5C illustrate a sound generating device and an adhesive member according to an embodiment of the present disclosure.

FIGS. 5A to 5C illustrate an embodiment of an adhesive member attached to a sound generating device, but the present disclosure is not limited thereto.

With reference to FIG. 5A, an example in which the length A1 of the first side of the adhesive member 403 is 0.3 times the length P1 of the first side of the sound generating device 400 and the length A2 of the second side of the adhesive member 403 is 0.5 times the length P2 of the second side of the sound generating device 400 is illustrated.

With reference to FIG. 5B, an example in which the length A1 of the first side of the adhesive member 403 is 0.5 times the length P1 of the first side of the sound generating device 400 and the length A2 of the second side of the adhesive member 403 is 1 time the length P2 of the second side of the sound generating device 400 is illustrated.

With reference to FIG. 5C, an example in which the length A1 of the first side of the adhesive member 403 is 0.25 times the length P1 of the first side of the sound generating device 400 and the length A2 of the second side of the adhesive member 403 is 1 time the length P2 of the second side of the sound generating device 400 is illustrated. The sound output characteristics of these examples will be described later with reference to FIG. 14.

Figure 6:
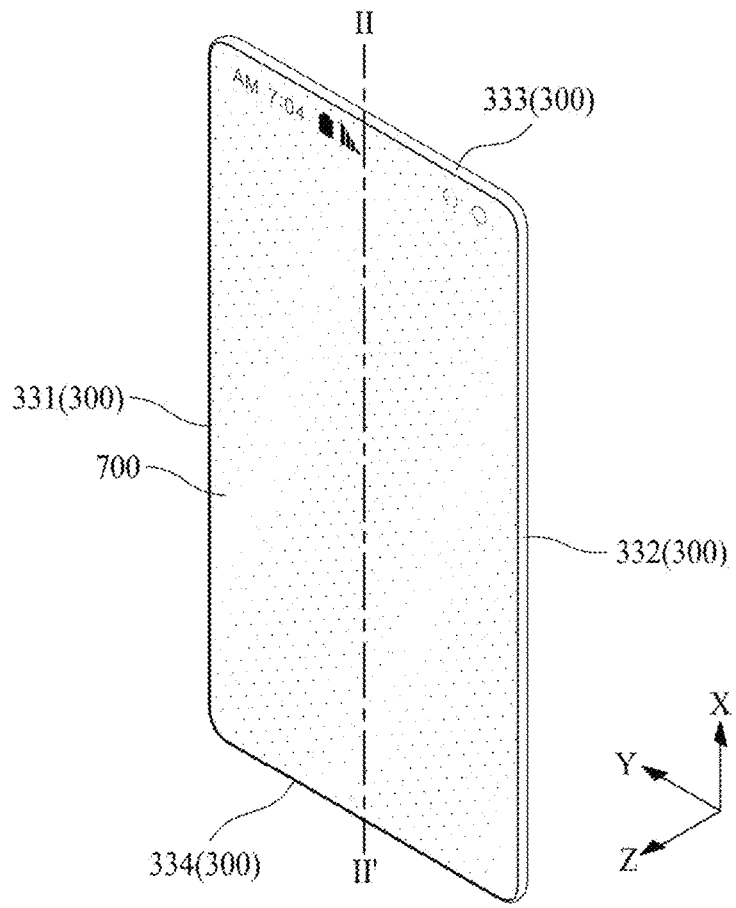
FIG. 6 illustrates a display apparatus according to an embodiment of the present disclosure.
Figure 7:
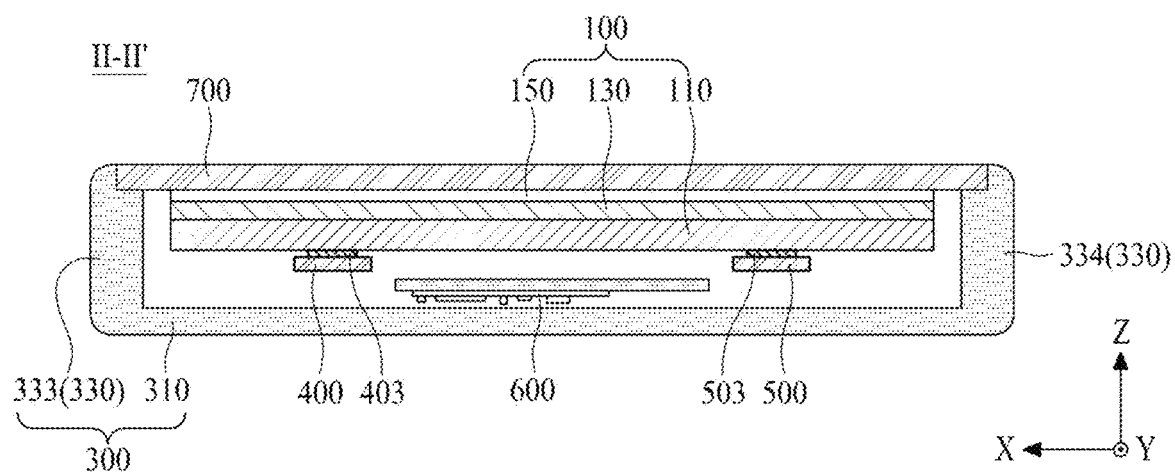
FIG. 7 is a cross-sectional view taken along line II-IF shown in FIG. 6.
Figure 8:
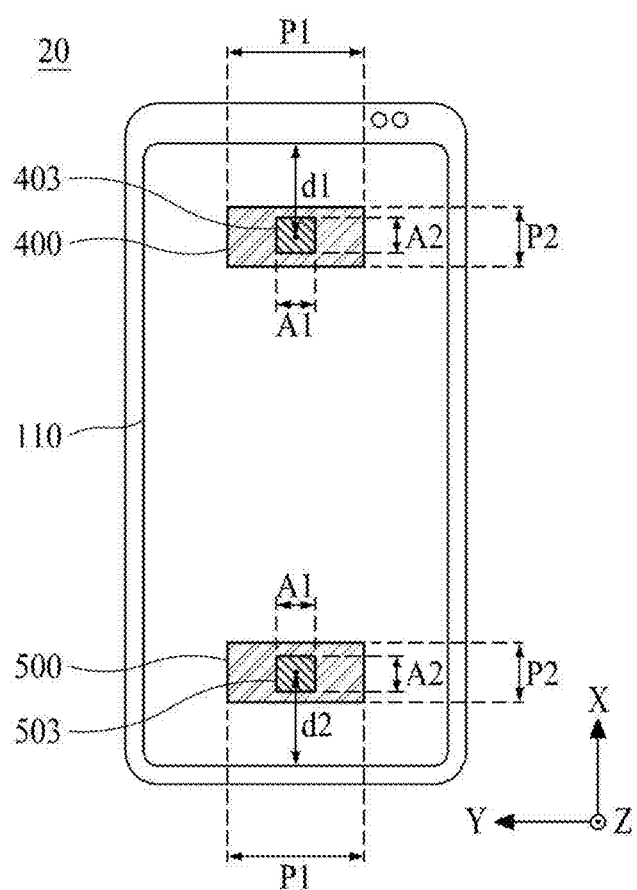
FIG. 8 is a rear view of a display panel shown in FIG. 6.

FIG. 6 illustrates a display apparatus according to another embodiment of the present disclosure. FIG. 7 is a cross-sectional view taken along line II-IF shown in FIG. 6. FIG. 8 is a rear view of the display panel illustrated in FIG. 6.

With reference to FIGS. 6 to 8, a display apparatus 20 according to an embodiment of the present disclosure may include a display module 100, a supporting member 300, a first sound generating device 400, and a second sound generating device 500. The display module 100 may include a display panel 110. The display module 100, the display panel 110, and the supporting member 300 are the same as those described above with reference to FIGS. 1 to 3, and thus a description thereof may be omitted or simplified.

With reference to FIGS. 6 to 8, the display apparatus 20 according to an embodiment of the present disclosure may further include the second sound generating device 500. The sound generating device 400 described above with reference to FIGS. 1 to 3 may be a first sound generating device, and the adhesive member 403 may be a first adhesive member.

The second sound generating device 500 may be attached or coupled to a rear surface of the display panel 110 via the second adhesive member 503. The second adhesive member 503 may be disposed at a partial region of the second sound generating device 500. For example, since the second adhesive member 503 is in a region which vibrates in the same direction as the second sound generating device 500 or at a central region of the second sound generating device 500, a vibration characteristic of the second sound generating device 500 may be improved. A height of the second adhesive member 503 may be set so as not to be in contact with the display panel 110 when the second sound generating device 500 is vibrated. The second adhesive member 503 may include a double-sided tape, a double-sided foam tape, a thermosetting adhesive, a photo-curable adhesive, and a natural curable adhesive, but is not limited thereto. For example, the thermosetting adhesive may be an epoxy resin, but is not limited thereto. For example, the second adhesive member 503 may be formed of polyurethane, polyolefin, and polyethylene, but is not limited thereto. The second adhesive member 503 may be a sticking member or a sticking agent but is not limited to a term.

To improve the vibration characteristic of the second sound generating device 500, the size of the second adhesive member 503 may be smaller than the size of the second sound generating device 500. The second sound generating device 500 may have a first side and a second side perpendicular to the first side. The second adhesive member 503 may have a first side and a second side perpendicular to the first side. The first side of the sound generating device may correspond to the first side of the adhesive member and the second side of the sound generating device may correspond to the second side of the adhesive member. For example, the first side of the sound generating device and the adhesive member may be in a widthwise direction, and the second side of the sound generating device and the adhesive member may be in a lengthwise direction. The widthwise direction and the lengthwise direction may be intermixed in any combination or interchangeable.

As another example, the vibration generating element of the second sound generating device 500 may have a shape such as a rectangle (e.g., quadrilateral), a square, a rhombus, and a parallelogram, and is not limited thereto. The second adhesive member 503 may be disposed corresponding to the shape of the sound generating device. For example, the second sound generating device 500 may be rectangular and may include a first side and a second side disposed adjacent to the first side and bent at a 90 degree angle so as to be disposed. For example, the second adhesive member 503 may be rectangular and may include a first side and a second side disposed adjacent to the first side and bent at a 90 degree angle so as to be disposed. The angle of the second side does not limit the embodiment of the present disclosure.

For example, a length A1 of the first side of the second adhesive member 503 may be 0.2 times to 1 time a length P1 of the first side of the second sound generating device 500. For example, a length A1 of the first side of the second adhesive member 503 may be more than 0.2 times to 1 time a length P1 of the first side of the second sound generating device 500. For example, a length A2 of the second side of the second adhesive member 503 may be 0.2 times to 1 time a length P2 of the second side of the second sound generating device 500. For example, a length A2 of the second side of the second adhesive member 503 may be more than 0.2 times to 1 time a length P2 of the second side of the second sound generating device 500.

For example, the size of the second adhesive member 503 may be varied according to the length P1 of the first side and the length P2 of the second side of the second sound generating device 500, but is not limited thereto. For example, when the length P1 of the first side of the second sound generating device 500 is larger than the length P2 of the second side of the second sound generating device 500, the length A1 of the first side of the second adhesive member 503 may be more than 0.2 times to less than 0.5 times the length P1 of the first side of the second sound generating device 500. For example, when the length P1 of the first side of the second sound generating device 500 is larger than the length P2 of the second side of the second sound generating device 500, the length A2 of the second side of the second adhesive member 503 may be more than 0.5 times to 1 time the length P2 of the second side of the second sound generating device 500. For example, when the length P1 of the first side of the second sound generating device 500 is smaller than the length P2 of the second side of the second sound generating device 500, the length A1 of the first side of the second adhesive member 503 may be more than 0.5 times to 1 time the length P1 of the first side of the second sound generating device 500. For example, when the length P1 of the first side of the second sound generating device 500 is smaller than the length P2 of the second side of the second sound generating device 500, the length A2 of the second side of the second adhesive member 503 may be more than 0.2 times to less than 0.5 times the length P2 of the second side of the second sound generating device 500. For example, when the length P1 of the first side of the second sound generating device 500 is equal to the length P2 of the second side of the second sound generating device 500, the length A1 of the first side of the second adhesive member 503 may be more than 0.4 times to 1 time the length P1 of the first side of the second sound generating device 500. For example, when the length P1 of the first side of the second sound generating device 500 is equal to the length P2 of the second side of the second sound generating device 500, the length A2 of the second side of the second adhesive member 503 may be more than 0.4 times to 1 time the length P2 of the second side of the second sound generating device 500.

With reference to FIG. 8, the first sound generating device 400 may be on an upper portion of the rear surface of the display panel 110. The display panel 110 may include a first short side, a second short side facing the first short side, and a long side perpendicular to the first short side or the second short side. For example, the first short side and the second short side may be in a widthwise direction of the display panel 110, and the long side may be in a lengthwise direction of the display panel 110. The widthwise direction and the lengthwise direction may be intermixed in any combination or interchangeable. For example, a distance d1 between the center of the first sound generating device 400 and the end of the first short side of the display panel 110 may be ¼ to ⅓ of the long side of the display panel 110. When the first sound generating device 400 is disposed on the upper side of the rear surface of the display panel 110, sound pressure may be further improved than when the first sound generating device 400 is disposed at the center of the display panel 110. The second sound generating device 500 may be on a lower portion of the rear surface of the display panel 110. For example, a distance d2 between the center of the second sound generating device 500 and the end of the second short side of the display panel 110 may be ¼ to ⅓ of the long side of the display panel. The second sound generating device 500 may be disposed to be symmetrical with the first sound generating device 400. For example, the second sound generating device 500 may be disposed to be symmetrical with the first sound generating device 400 with respect to a middle portion CL1 of the display module 100.

Figure 9:
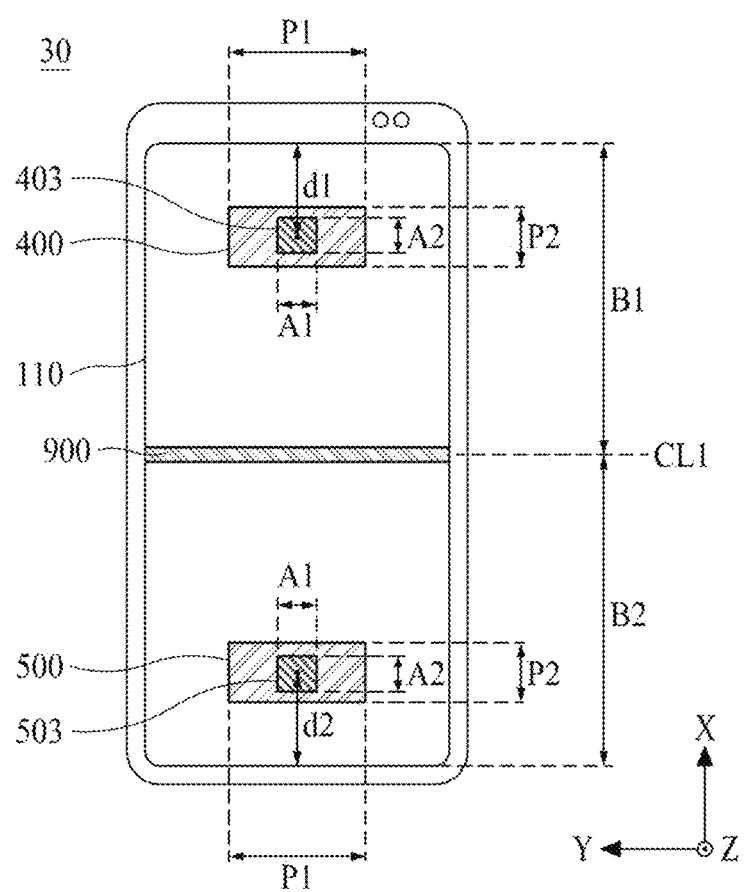
FIG. 9 is a rear view of a display panel according to an embodiment of the present disclosure.

FIG. 9 is a rear view of a display panel according to another embodiment of the present disclosure.

With reference to FIG. 9, the display apparatus 30 according to an embodiment of the present disclosure may include a first sound generating device 400 and a second sound generating device 500. The first sound generating device 400 may vibrate a first rear region B1 of the display module 100 according to a vibration driving signal provided from a driving circuit unit 600. The first rear region B1 may be a region between a middle portion CL1 of the display module 100 or a rear middle portion and one end 110a of the display module 100 with respect to a first lengthwise direction or a long side direction X of the display module 100, or a rear right region. For example, the first rear region B1 may be one edge or periphery region of the display module 100 or an edge or periphery region of a right/left upper portion of the display module 100 with respect to the lengthwise direction or the long side direction X of the display module 100.

The second sound generating device 500 may vibrate the second rear region B2 of the display module 100 according to a vibration driving signal provided from the driving circuit unit 600. The second rear region B2 may be a region between the middle part CL1 of the display module 100 and the other end of the display module 100 with respect to the lengthwise direction or the long side direction X of the display module 100 or a rear left region. For example, the second rear region B2 may be the other edge or periphery region or an edge or periphery region of the left/right portion of the display module 100 with respect to the lengthwise direction or the long side direction X of the display module 100. The second sound generating device 500 may be disposed to be symmetrical with the first sound generating device 400. For example, the second sound generating device 500 may be disposed to be symmetrical with the first sound generating device 400 with respect to the middle portion CL1 of the display module 100.

The display apparatus 30 according to an embodiment of the present disclosure may further include a partition 900. The partition 900 may be in the rear middle portion CL1 of the display module 100. For example, the partition 900 may be between the first sound generating device 400 and the second sound generating device 500. For example, the partition 900 may spatially separate or divide a first rear surface region B1 overlapping the first sound generating device 400 on the rear surface of the display panel 110 and a second rear surface region B2 overlapping the second sound generating device 500 on the rear surface of the display panel 110, thereby reducing or preventing interference between sounds respectively generated from the first rear region B1 and the second rear region B2. The partition 900 may spatially separate or divide the first rear surface region B1 and the second rear surface region B2 on the rear surface of the display module 100, for example, the display panel 110, thereby preventing interference between the sound generated from each of the first rear surface region B1 and the second rear region B2. For example, sound may be improved as compared with FIG. 8. Accordingly, the partition 900 may separate sounds respectively generated by the first sound generating device 400 and the second sound generating device 500, thereby reducing or preventing interference between the sounds, whereby sound of, for example, 2.0 channel type may be output to the front of the display module 100 according to vibration of the display module 100.

The partition 900 may be between the rear surface of the display module 100 and a supporting member bottom portion 310 of the supporting member 300. The rear surface of the partition 900 may be adhered to the supporting member rear surface portion 310 of the supporting member 300 and the front surface of the partition 900 may be adhered to the rear surface of the display module 100 or may be in contact with the rear surface of the display module 100 in a non-contact manner. For example, the partition 900 may include, but is not limited to, a single-sided tape, a foam pad, a double-sided tape, a double-sided foam tape, an adhesive, and an adhesive resin. The partition 900 may be referred to as an "enclosure" or a "baffle" and is not limited thereto.

The sound generating device described above with reference to FIGS. 6 to 9 may be applied to a receiver and a speaker of an electronic device, but is not limited thereto. The receiver may transmit a call sound from an electronic device to the user's ear. For example, when operating as a receiver of an electronic device or the like, the first sound generating device 400 may receive a vibration driving signal from a sound processing circuit. For example, when the first sound generating device is applied to a receiver of an electronic device or the like, a sound may be transferred to the user or the user may receive the sound by the first sound generating device, and thus, a display apparatus capable of providing an enhanced call sound or a sound to the user may be provided. For example, when operating as a speaker of an electronic device or the like, the first sound generating device 400 and the second sound generating device 500 may receive a vibration driving signal from each sound processing circuit. Thus, a sound may be delivered to the user by the first sound generating device and the second sound generating device. For example, a surround sound may be transferred to the user by the first sound generating device and the second sound generating device.

Figure 10A:
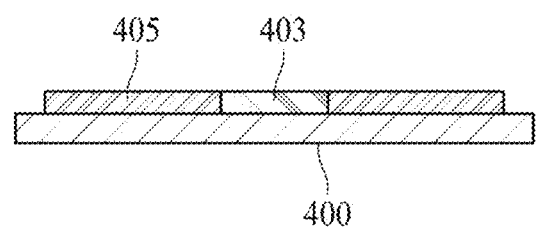
FIGS. 10A and 10B illustrate a sound generating device and an adhesive member according to an embodiment of the present disclosure.
Figure 10B:
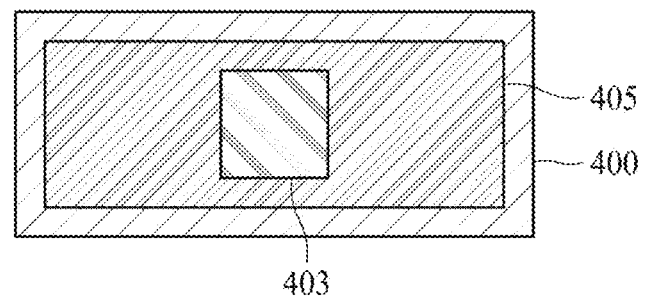

FIGS. 10A and 10B show a sound generating device and an adhesive member according to an embodiment of the present disclosure.

FIG. 10A is a side view and FIG. 10B is a front view. FIGS. 10A and 10B will be described with reference to FIGS. 1 to 3, and the same may be applied to FIGS. 6 to 9.

With reference to FIGS. 10A and 10B, the sound generating device 400 according to an embodiment of the present disclosure may further include a third adhesive member 405. The adhesive member 403 described in FIGS. 1 to 3 and FIGS. 5 to 9 may be a first adhesive member. Since the first adhesive member 403 of the sound generating device 400 is not attached to the entire surface of the sound generating device 400, detachment of the sound generating device 400 due to a reduction in an adhesion area of the sound generating device 400 may be prevented by the third adhesive member 405. For example, the third adhesive member 405 may be in a periphery of the first adhesive member 403. For example, the third adhesive member 405 may surround the first adhesive member 403. The third adhesive member 405 may assist the attachment of the first adhesive member 403 and may not affect vibration of the sound generating device 400. The third adhesive member 405 may include a double-sided tape, a double-sided foam tape, a thermosetting adhesive, a photo-curable adhesive, and a natural curable adhesive, but is not limited thereto. For example, the thermosetting adhesive may be an epoxy resin, but is not limited thereto. For example, the third adhesive member 405 may be formed of polyurethane, polyolefin, and polyethylene, but is not limited thereto.

As the attachment or contact area of the sound generating device increases, robustness or stiffness of attachment of the sound generating device may be ensured. Since the adhesive member is not attached to the entire surface of the sound generating device, the attachment or contact area of the sound generating device is reduced and the sound generating device may be detached due to vibration or external impact of the sound generating device. To prevent this, the sound generating device may be fixed to the display panel by fastening a bolt or the like, welding or the like, but it was recognized that there are problems such as a difficulty in the process or an increase in cost. Therefore, the inventors of the present disclosure realized a sound generating device having a novel structure in which a structure is disposed to prevent detachment of the sound generating device. This will be described with reference to FIGS. 11 to 13. The structure may be applied to FIGS. 1 to 3, and FIGS. 6 to 10.

Figure 11A:
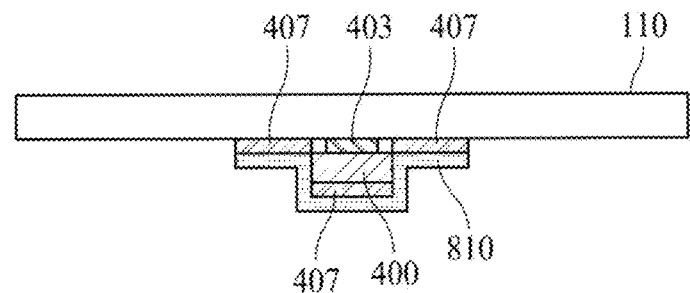
FIGS. 11A and 11B illustrate a sound generating device and a structure according to an embodiment of the present disclosure.
Figure 11B:
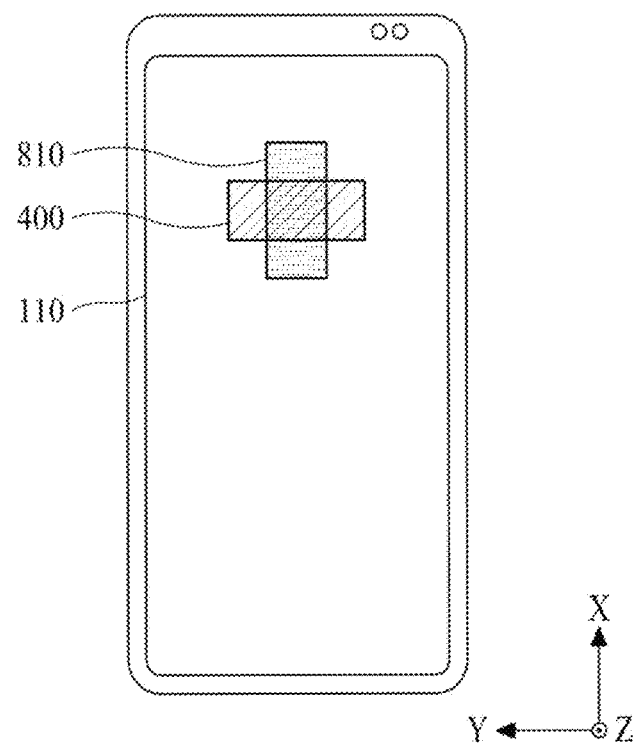

FIGS. 11A and 11B illustrate a sound generating device and a structure according to an embodiment of the present disclosure.

FIG. 11A is a side view and FIG. 11B is a front view. With reference to FIGS. 11A and 11B, a structure 810 may be further in a partial region of the sound generating device 400. For example, the structure 810 may be on a lower surface and a side surface of the sound generating device 400. For example, the structure 810 may support the lower surface and the side surface of the sound generating device 400. For example, the structure 810 may surround the lower surface and the side surface of the sound generating device 400. The structure 810 may be formed of a material having high rigidity. For example, the structure 810 may be formed of stainless steel, polyethylene terephthalate (PET), and a foam tape, but is not limited thereto. A fourth adhesive member 407 may be between the structure 810 and the sound generating device 400 and between the structure 810 and the display panel 110. The fourth adhesive member 407 may be formed of a double-sided tape, a double-sided foam tape, a thermosetting adhesive, a photo-curable adhesive, and a natural curable adhesive, but is not limited thereto. For example, the thermosetting adhesive may be an epoxy resin, but is not limited thereto. For example, the fourth adhesive member 407 may be formed of polyurethane, polyolefin, and polyethylene, but is not limited thereto. Therefore, by further configuring the structure at the partial region of the sound generating device, the bonding area of the sound generating device with respect to the display panel may be enhanced, thereby improving durability against vibration or external impact of the sound generating device and improving durability against detachment of the sound generating device.

Figure 12A:
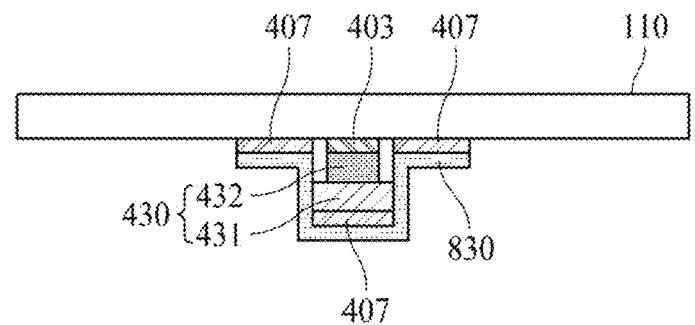
FIGS. 12A and 12B illustrate a sound generating device and a structure according to an embodiment of the present disclosure.
Figure 12B:
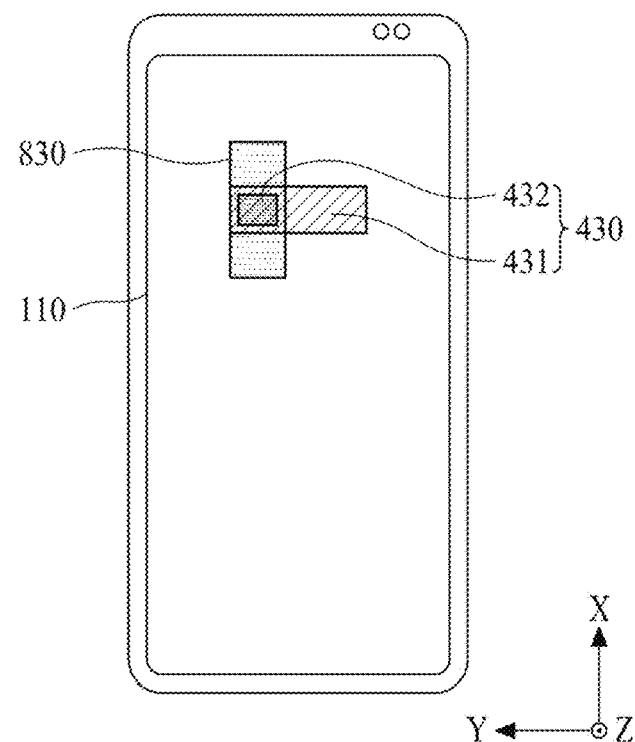

FIGS. 12A and 12B illustrate a sound generating device and a structure according to an embodiment of the present disclosure.

FIG. 12A is a side view and FIG. 12B is a front view. The sound generating device of FIGS. 12A and 12B is a cantilever beam type sound generating device 430, for example. With reference to FIGS. 12A and 12B, the sound generating device 430 may include an anchor 431 and a beam 432. A structure 830 may be further disposed at a partial region of the sound generating device 430. For example, the anchor 431 of the sound generating device 430 and the structure 830 may be further disposed at a partial region of the beam 432. For example, the structure 830 may be further disposed on a lower surface and a side surface of the sound generating device 430. For example, the structure 830 may support the lower surface and the side surface of the sound generating device 430. For example, the structure 830 may surround the lower surface and the side surface of the sound generating device 430. The structure 830 may be formed of a material having high rigidity. For example, the structure 830 may be formed of stainless steel, polyethylene terephthalate (PET) and foam tape, but is not limited thereto. A fourth adhesive member 407 may be disposed between the structure 830 and the sound generating device 430 and between the structure 830 and the display panel 110. The fourth adhesive member 407 may include a double-sided tape, a double-sided foam tape, a thermosetting adhesive, a photo-curable adhesive, and a natural curable adhesive, but is not limited thereto. For example, the thermosetting adhesive may be an epoxy resin, but is not limited thereto. For example, the fourth adhesive member 407 may be formed of polyurethane, polyolefin, and polyethylene, but is not limited thereto. Therefore, by further configuring the structure at the partial region of the sound generating device, the bonding area of the sound generating device with respect to the display panel may be enhanced, thereby improving durability against vibration or external impact of the sound generating device and improving durability against detachment of the sound generating device.

Figure 13A:
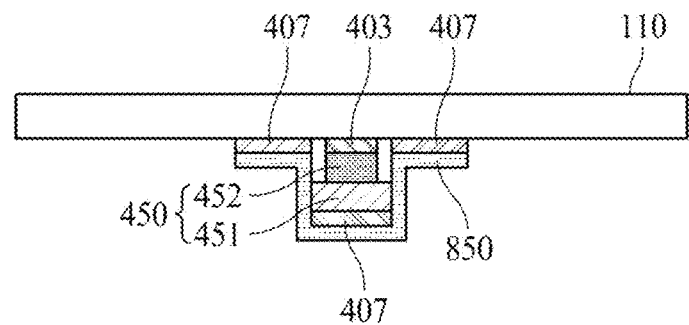
FIGS. 13A to 13C illustrate a sound generating device and a structure according to an embodiment of the present disclosure.
Figure 13B:
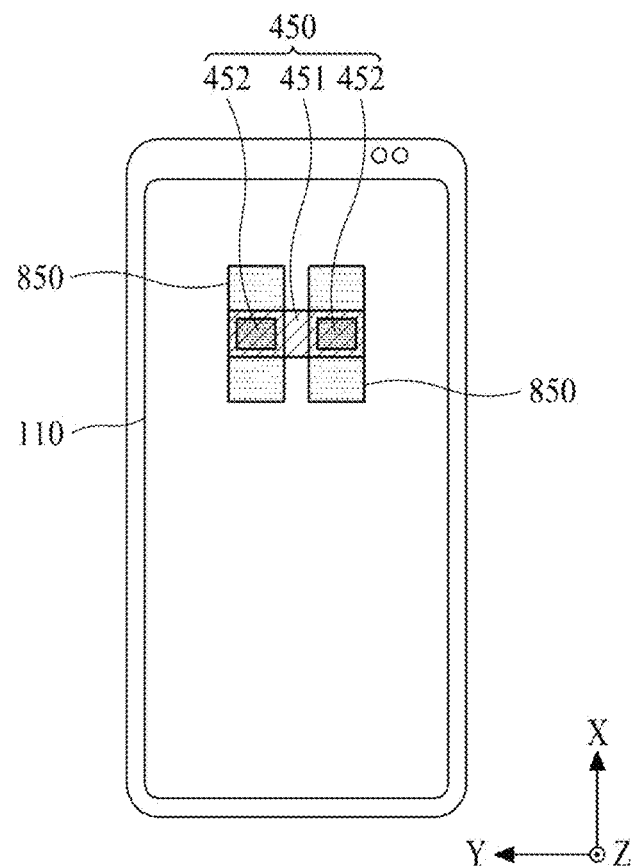
Figure 13C:
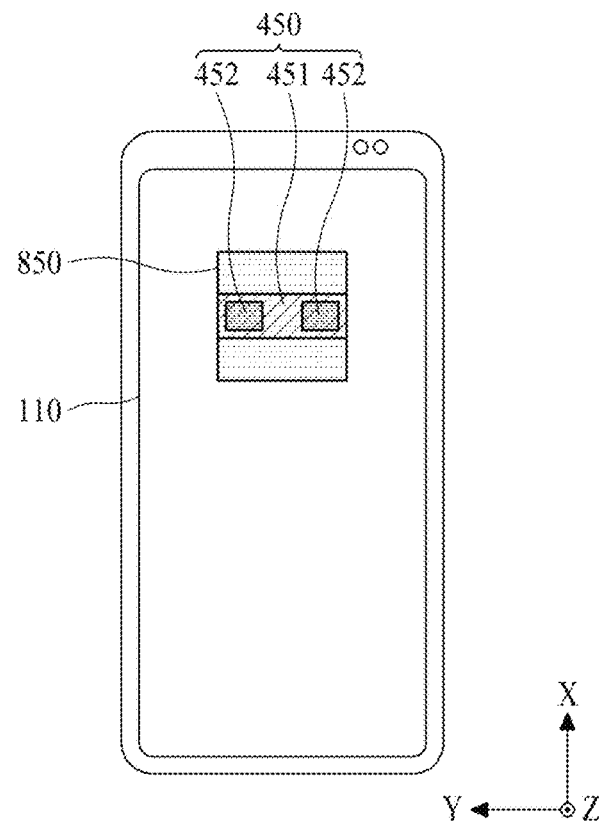

FIGS. 13A to 13C illustrate a sound generating device and a structure according to an embodiment of the present disclosure.

FIG. 13A is a side view and FIGS. 13B and 13C are front views. The sound generating device of FIGS. 13A to 13C is a both-end clamped beam type sound generating device 450, for example. With reference to FIGS. 13A to 13C, the sound generating device 450 may include an anchor 451 and a beam 452. The anchor 451 may be formed of the same material as a double-sided tape or beam 452 but is not limited thereto. A structure 850 may be further disposed at a partial region of the sound generating device 450. For example, the anchor 451 of the sound generating device 450 and the structure 850 may be further disposed at a partial region of the beam 452. For example, the structure 850 may be further on a lower surface and a side surface of the sound generating device 450. For example, the structure 850 may support the lower surface and the side surface of the sound generating device 450. For example, the structure 850 may surround the lower surface and the side surface of the sound generating device 450. With reference to FIG. 13B, two structures 850 may be disposed with respect to the sound generating device 450. For example, the two structures 850 may be disposed to correspond to the anchor 451 of the sound generating device 450. With reference to FIG. 13C, the structure 850 may be disposed at a partial region of the sound generating device 450. For example, the structure 850 may cover the anchor 451 and the beam 452 of the sound generating device 450. With reference to FIGS. 13A to 13C, the structure 850 may be formed of a material having high rigidity. For example, the structure 850 may be formed of stainless steel, polyethylene terephthalate (PET) and foam tape, but is not limited thereto. A fourth adhesive member 407 may be disposed between the structure 850 and the sound generating device 450 and between the structure 850 and the display panel 110. The fourth adhesive member 407 may include a double-sided tape, a double-sided foam tape, a thermosetting adhesive, a photo-curable adhesive, and a natural curable adhesive, but is not limited thereto. For example, the thermosetting adhesive may be an epoxy resin, but is not limited thereto. For example, the fourth adhesive member 407 may be formed of polyurethane, polyolefin, and polyethylene, but is not limited thereto. Therefore, by further configuring the structure at the partial region of the sound generating device, the bonding area of the sound generating device may be enhanced, thereby improving durability against vibration or external impact of the sound generating device and improving durability against detachment of the sound generating device. The contents described above with reference to FIGS. 3 and 6 to 9 may also be applied to the FIGS. 11 to 13 in the same manner.

Figure 14:
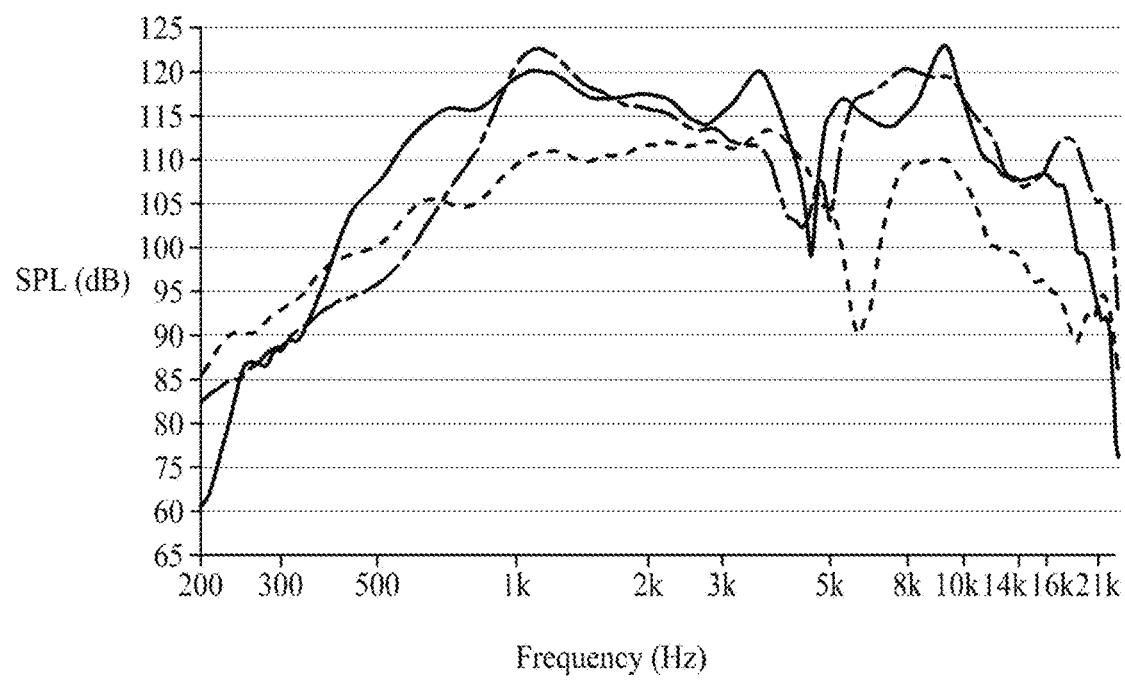
FIG. 14 illustrates a sound output characteristic of a sound generating device according to an embodiment of the present disclosure.

FIG. 14 illustrates a sound output characteristic of a sound generating device according to an embodiment of the present disclosure.

In FIG. 14, the dotted line represents a sound output characteristic when an adhesive member is attached to the entire surface of the sound generating device, the alternated long and short dash line represents a sound output characteristic of FIG. 5B, and the solid line represents a sound output characteristic of FIG. 5C. The horizontal axis represents frequency in hertz (Hz) and the vertical axis represents a sound pressure level (SPL) in decibel (dB).

The sound output characteristic may be measured by sound analysis equipment. The sound analysis equipment may include a sound card transmitting and receiving sound to and from a control PC, an amplifier amplifying a sound generated from the sound card to a sound generating device, and a microphone collecting a sound generated through a sound generating device from a display panel. The sound collected by the microphone is input to the control PC through the sound card, and a control program checks the sound to analyze the sound of the sound generating device.

The sound output characteristic was measured with respect to an anechoic chamber closed on all sides, and measurement equipment was APx525 equipment manufactured by Audio Precision. A sound pressure measurement was measured at a distance of about 10 mm from the display panel. An applied frequency signal was sine sweep from 20 Hz to 20 kHz and a measurement result underwent ⅓ octave smoothing. However, the measurement method is not limited to this example.

With reference to FIG. 14, in the case of FIG. 5B, which is a display apparatus according to an embodiment of the present disclosure, it can be seen that sound pressure of about 5 dB to 10 dB or higher is improved in the entire surface of about 400 Hz or higher as compared with the dotted line corresponding to a case where a bonding agent is formed on the entire surface of the sound generating device. In the case of FIG. 5C, which is a display apparatus according to an embodiment of the present disclosure, it can be seen that sound pressure of about 5 dB to 10 dB or higher is improved in the entire surface of about 400 Hz or higher as compared with the dotted line corresponding to a case where a bonding agent is formed on the entire surface of the sound generating device. Therefore, it can be seen that when the adhesive member is formed on a partial region of the sound generating device, sound pressure is improved as compared with the case where the adhesive member is formed on the entire surface of the sound generating device.

A sound generating apparatus according to an embodiment of the present disclosure may be applied to a sound generating apparatus disposed in a display apparatus. A display apparatus according to an embodiment of the present disclosure may be applied to a mobile apparatus, a video phone, a smart watch, a watch phone, a wearable apparatus, a foldable apparatus, a rollable apparatus, a bendable apparatus, a flexible apparatus, a curved apparatus, an electronic notebook, an electronic book, a portable multimedia player (PMP), a personal digital assistant (PDA), an MP3 player, a mobile medical apparatus, a desktop PC, a laptop PC, a netbook computer, a workstation, a navigation apparatus, an automotive navigation apparatus, an automotive display apparatus, a television, a wallpaper apparatus, a signage apparatus, a game apparatus, a notebook, a monitor, a camera, a camcorder, and a home appliance. The sound generating apparatus of the present disclosure may be applied to an organic light emitting illuminating apparatus or an inorganic light emitting illuminating apparatus. When the sound generating apparatus is applied to a lighting apparatus, it may serve as lighting and a speaker. The sound generating apparatus of the present disclosure may be applied to a receiver and/or a speaker of an electronic apparatus or the like.

A display apparatus according to an embodiment of the present disclosure may be described as follows.

According to an embodiment of the present disclosure, a display apparatus includes: a display module having a display panel configured to display an image; a sound generating device on a rear surface of the display panel and including a first side and a second side perpendicular to the first side; and an adhesive member in a partial region of the sound generating device, the adhesive member having a size smaller than one of the first side and the second side of the sound generating device.

For example, in the display apparatus according to an embodiment of the present disclosure, the adhesive member may be in a central region of the sound generating device.

For example, in the display apparatus according to an embodiment of the present disclosure, the adhesive member may have a first side and a second side perpendicular to the first side, and a length of the first side of the adhesive member may be 0.2 times to 1 time a length of the first side of the sound generating device.

For example, in the display apparatus according to an embodiment of the present disclosure, the adhesive member may have a first side and a second side perpendicular to the first side, and a length of the second side of the adhesive member may be 0.2 times to 1 time a length of the second side of the sound generating device.

For example, in the display apparatus according to an embodiment of the present disclosure, the adhesive member may have a first side and a second side perpendicular to the first side, and a length of the first side of the adhesive member may be 0.2 times to 1 time a length of the first side of the sound generating device and a length of the second side of the adhesive member may be equal to a length of the second side of the sound generating device.

For example, the display apparatus according to an embodiment of the present disclosure may further include a third adhesive member in a periphery of the adhesive member.

For example, in the display apparatus according to an embodiment of the present disclosure, the third adhesive member may be disposed to surround the adhesive member.

For example, the display apparatus according to an embodiment of the present disclosure may further include a structure configured to support a side surface and a lower surface of the sound generating device.

For example, in the display apparatus according to an embodiment of the present disclosure, the structure may be formed of a rigid material.

For example, in the display apparatus according to an embodiment of the present disclosure, the structure may be disposed at a partial region of the sound generating device.

For example, the display apparatus according to an embodiment of the present disclosure may further include a fourth adhesive member between the structure and the sound generating device.

For example, in the display apparatus according to an embodiment of the present disclosure, the display panel may include a first short side, a second short side facing the first short side, and a long side perpendicular to the first short side or the second short side, and a distance from a center of the sound generating device to an end of the first short side of the display panel may be ¼ to ⅓ with respect to the long side of the display panel.

For example, the display apparatus according to an embodiment of the present disclosure may further include a second sound generating device on a rear surface of the display panel and including a first side and a second side perpendicular to the first side; and a second adhesive member between the display panel and the second sound generating device and including a first side and a second side perpendicular to the first side.

For example, the display apparatus according to an embodiment of the present disclosure may further include a partition on the rear surface of the display panel and configured to separate sounds respectively generated by the sound generating device and the second sound generating device from each other.

For example, in the display apparatus according to an embodiment the present disclosure, a length of the first side of the second adhesive member may be 0.2 times to 1 time a length of the first side of the second sound generating device and a length of the second side of the second adhesive member may be equal to a length of the second side of the second sound generating device.

For example, in the display apparatus according to an embodiment of the present disclosure, the display panel may include a first short side, a second short side facing the first short side, and a long side perpendicular to the first short side or the second short side, and a distance from a center of the second sound generating device to an end of the second short side of the display panel may be ¼ to ⅓ with respect to the long side of the display panel.

For example, in the display apparatus according to an embodiment of the present disclosure, the sound generating device may be disposed to be symmetrical with the second sound generating device with respect to a middle portion of the display module.

According to an embodiment of the present disclosure, a display apparatus includes: a display module having a display panel configured to display an image; a sound generating device on a rear surface of the display panel and including a first side and a second side perpendicular to the first side; and an adhesive member between the display panel and the sound generating device, the adhesive member including a first side and a second side perpendicular to the first side, wherein a length of the first side of the adhesive member is smaller than or equal to a length of the first side of the sound generating device and a length of the second side of the adhesive member is smaller than or equal to a length of the second side of the sound generating device.

For example, in the display apparatus according to an embodiment of the present disclosure, a length of the first side of the adhesive member may be 0.2 times to 1 time a length of the first side of the sound generating device and a length of the second side of the adhesive member may be 0.2 times to 1 time a length of the second side of the sound generating device.

For example, in the display apparatus according to an embodiment of the present disclosure, a length of the first side of the adhesive member may be 0.2 times to 1 time a length of the first side of the sound generating device and a length of the second side of the adhesive member may be equal to a length of the second side of the sound generating device.

For example, the display apparatus according to an embodiment of the present disclosure may further include a third adhesive member in a periphery of the adhesive member.

For example, in the display apparatus according to an embodiment of the present disclosure, the third adhesive member may be disposed to surround the adhesive member.

For example, the display apparatus according to an embodiment of the present disclosure may further include a structure configured to support a side surface and a lower surface of the sound generating device.

For example, in the display apparatus according to an embodiment of the present disclosure, the structure may be formed of a rigid material.

For example, in the display apparatus according to an embodiment of the present disclosure, the structure may be disposed at a partial region of the sound generating device.

For example, the display apparatus according to an embodiment of the present disclosure may further include a fourth adhesive member between the structure and the sound generating device.

For example, in the display apparatus according to an embodiment of the present disclosure, the display panel may include a first short side, a second short side facing the first short side, and a long side perpendicular to the first short side or the second short side, and a distance from a center of the sound generating device to an end of the first short side of the display panel may be ¼ to ⅓ with respect to the long side of the display panel.

For example, the display apparatus according to an embodiment of the present disclosure may further include: a second sound generating device on a rear surface of the display panel and including a first side and a second side perpendicular to the first side; and a second adhesive member between the display panel and the second sound generating device and including a first side and a second side perpendicular to the first side.

For example, the display apparatus according to an embodiment of the present disclosure may further include a partition on the rear surface of the display panel and configured to separate sounds respectively generated by the sound generating device and the second sound generating device from each other.

For example, in the display apparatus according to an embodiment of the present disclosure, a length of the first side of the second adhesive member may be 0.2 times to 1 time a length of the first side of the second sound generating device and a length of the second side of the second adhesive member may be equal to a length of the second side of the second sound generating device.

For example, in the display apparatus according to an embodiment of the present disclosure, the display panel may include a first short side, a second short side facing the first short side, and a long side perpendicular to the first short side or the second short side, and a distance from a center of the second sound generating device to an end of the second short side of the display panel may be ¼ to ⅓ with respect to the long side of the display panel.

For example, in the display apparatus according to an embodiment of the present disclosure, the sound generating device may be disposed to be symmetrical with the second sound generating device with respect to a middle portion of the display module.

It will be apparent to those skilled in the art that various modifications and variations may be made in the display apparatus of the present disclosure without departing from the technical idea or scope of the disclosures. Thus, it is intended that embodiments the present disclosure cover the modifications and variations of the disclosure provided they come within the scope of the appended claims and their equivalents.

What is claimed is:

1. A display apparatus, comprising:
a display module having a display panel configured to display an image;
a sound generating device on a rear surface of the display panel;
a first adhesive member between the display module and the sound generating device; and
a structure configured to support a lower surface of the sound generating device and to further support at least one of a plurality of side surfaces of the sound generating device.

2. The display apparatus of claim 1, wherein the sound generating device includes a first side and a second side perpendicular to the first side, and
wherein the structure is configured to support at least one of the first side and the second side of the sound generating device.

3. The display apparatus of claim 2, wherein the first adhesive member is at at least a part of a central region of the sound generating device, the first adhesive member having a smaller size than one of the first side and the second side of the sound generating device.

4. The display apparatus of claim 2, wherein:
the first adhesive member has a first side and a second side perpendicular to the first side, and
a length of the first side of the first adhesive member is 0.2 to 1 times a length of the first side of the sound generating device, and a length of the second side of the first adhesive member is 0.2 to 1 times a length of the second side of the sound generating device.

5. The display apparatus of claim 1, further comprising a third adhesive member in a periphery of the first adhesive member, the third adhesive member being disposed to surround a periphery of the first adhesive member.

6. The display apparatus of claim 1, wherein the structure is disposed at a partial region of the sound generating device.

7. The display apparatus of claim 1, wherein at least part of the structure is disposed on the rear surface of the display panel.

8. The display apparatus of claim 7, further comprising a fourth adhesive member between the structure and the sound generating device, and between the structure and the rear surface of the display panel.

9. The display apparatus of claim 1, wherein:
the display panel comprises a first short side, a second short side facing the first short side, and a long side perpendicular to the first short side or the second short side; and
a distance from a center of the sound generating device to an end of the first short side of the display panel is ¼ to ⅓ of a length of the long side of the display panel or is ⅔ to ¾ of the length of the long side of the display panel.

10. A display apparatus, comprising:
a display module having a display panel configured to display an image;
a plurality of sound generating devices on a rear surface of the display panel;
an adhesive member between the display module and the plurality of sound generating devices; and
a structure configured to support a lower surface of each of the plurality of sound generating devices and to further support at least one of a plurality of side surfaces of each of the plurality of sound generating devices.

11. The display apparatus of claim 10, wherein:
the plurality of sound generating devices comprises a first sound generating device and a second sound generating device on the rear surface of the display panel,
the first sound generating device and the second sound generating device each include a first side and a second side perpendicular to the first side, and
the structure is configured to support at least one of the first side and the second side of each of the first sound generating device and the second sound generating device.

12. The display apparatus of claim 11, further comprising a partition on the rear surface of the display panel and disposed between the first sound generating device and the second sound generating device.

13. The display apparatus of claim 11, wherein the adhesive member is at at least a part of a central region of at least one of the first and second sound generating devices, the adhesive member having a smaller size than one of the first side and the second side of the at least one of the first and second sound generating devices.

14. The display apparatus of claim 11, wherein:
the adhesive member has a first side and a second side perpendicular to the first side,
a length of the first side of the adhesive member is 0.2 to 1 times a length of the first side of at least one of the first and second sound generating devices, and
a length of the second side of the adhesive member is 0.2 to 1 times a length of the second side of the at least one of the first and second sound generating devices.

15. The display apparatus of claim 10, further comprising a third adhesive member in a periphery of the adhesive member, the third adhesive member being disposed to surround a periphery of the adhesive member.

16. The display apparatus of claim 10, wherein the structure is disposed at a partial region of the plurality of sound generating devices.

17. The display apparatus of claim 10, wherein at least part of the structure is on the rear surface of the display panel.

18. The display apparatus of claim 17, further comprising a fourth adhesive member between the structure and the plurality of sound generating devices, and between the structure and the rear surface of the display panel.

19. The display apparatus of claim 11, wherein:
the display panel comprises a first short side, a second short side facing the first short side, and a long side perpendicular to the first short side or the second short side;
a distance from a center of the first sound generating device to an end of the first short side of the display panel is ¼ to ⅓ of a length of the long side of the display panel; and
a distance from a center of the second sound generating device to an end of the second short side of the display panel is ¼ to ⅓ of a length of the long side of the display panel.

20. The display apparatus of claim 11, wherein the first sound generating device is disposed to be symmetrical with the second sound generating device with respect to a middle portion of the display module.

* * * * *